(12) United States Patent
Liu

(10) Patent No.: US 10,210,250 B2
(45) Date of Patent: Feb. 19, 2019

(54) MOBILE TERMINAL-BASED SONG RECOMMENDATION METHOD AND DEVICE

(71) Applicant: BEIJING YINZHIBANG CULTURE TECHNOLOGY CO., LTD., Beijing (CN)

(72) Inventor: Zhaoyang Liu, Beijing (CN)

(73) Assignee: BEIJING YINZHIBANG CULTURE TECHNOLOGY CO., LTD., Beijing (CN)

( * ) Notice: Subject to any disclaimer, the term of this patent is extended or adjusted under 35 U.S.C. 154(b) by 443 days.

(21) Appl. No.: 14/909,177

(22) PCT Filed: Jun. 5, 2014

(86) PCT No.: PCT/CN2014/079301
§ 371 (c)(1),
(2) Date: Mar. 23, 2016

(87) PCT Pub. No.: WO2015/014157
PCT Pub. Date: Feb. 5, 2015

(65) Prior Publication Data
US 2016/0275185 A1 Sep. 22, 2016

(30) Foreign Application Priority Data
Jul. 30, 2013 (CN) .......................... 2013 1 0325656

(51) Int. Cl.
*G06F 17/30* (2006.01)
*G06F 3/01* (2006.01)
(Continued)

(52) U.S. Cl.
CPC ........ *G06F 17/30752* (2013.01); *G06F 3/017* (2013.01); *G06F 3/0482* (2013.01);
(Continued)

(58) Field of Classification Search
CPC ... G06F 17/30265; G06F 3/0488; G06F 3/048
(Continued)

(56) References Cited

U.S. PATENT DOCUMENTS

2009/0182736 A1* 7/2009 Ghatak ................. G06Q 30/02
2012/0127082 A1* 5/2012 Kushler ............. G06F 3/04886
345/169

(Continued)

FOREIGN PATENT DOCUMENTS

CN 1418341 5/2003
CN 103218159 7/2013
(Continued)

OTHER PUBLICATIONS

SIPO, Office Action for CN Application No. 201310325656, dated Jan. 20, 2016.

*Primary Examiner* — Hung T Vy
(74) *Attorney, Agent, or Firm* — Hodgson Russ LLP

(57) ABSTRACT

Proposed is a mobile terminal-based song recommendation method. The method comprises the following steps: providing a gesture management interface in a mobile terminal, and receiving and storing a gesture symbol input by a user in the gesture management interface; establishing an association relationship between the gesture symbol and a key word recognized by the mobile terminal; receiving the gesture symbol input by the user; judging whether the gesture symbol input by the user is in the mobile terminal or not; and if the gesture symbol is in the mobile terminal, recommending one or more songs in the mobile terminal according to the gesture symbol.

17 Claims, 6 Drawing Sheets

(51) Int. Cl.
*G06F 3/0482* (2013.01)
*G06F 3/0488* (2013.01)

(52) U.S. Cl.
CPC ........ *G06F 3/0488* (2013.01); *G06F 3/04883* (2013.01); *G06F 17/30029* (2013.01); *G06F 17/30749* (2013.01); *G06F 17/30769* (2013.01)

(58) Field of Classification Search
USPC .......................................................... 707/722
See application file for complete search history.

(56) References Cited

U.S. PATENT DOCUMENTS

| | | | |
|---|---|---|---|
| 2012/0268373 A1 | 10/2012 | Grzesiak | |
| 2012/0324398 A1* | 12/2012 | Lee | H04N 21/4312 715/810 |
| 2013/0080371 A1* | 3/2013 | Harber | G06F 17/30752 706/50 |
| 2013/0225236 A1* | 8/2013 | Lee | G06F 3/0488 455/556.1 |
| 2014/0229894 A1* | 8/2014 | Vinna | G06F 17/30772 715/810 |

FOREIGN PATENT DOCUMENTS

| | | |
|---|---|---|
| WO | 2012087418 | 6/2012 |
| WO | 2012088374 | 6/2012 |

\* cited by examiner

MOBILE TERMINAL-BASED SONG RECOMMENDATION METHOD AND DEVICE

CROSS-REFERENCE TO RELATED APPLICATION

This application is a U.S. National Phase application of International Patent Application No. PCT/CN2014/079301, filed Jun. 5, 2014, which claims the benefit of Chinese Application No. 201310325656.6 filed Jul. 30, 2013, the disclosures of which are incorporated herein by reference in their entirety.

FIELD

Embodiments of the present disclosure generally relate to the field of automatic control technology, and more particularly, to a mobile terminal-based song recommendation method for and a mobile terminal-based song recommendation device.

BACKGROUND

For current song recommendation in the related art, songs may be recommended to a user basically by analyzing the user's listening behavior and habit data. The user can only receive them passively but cannot select. However, the reality is that, the user's listening needs may be varied with current mood, environment and other factors. For example, A is a shy girl and likes to listen to Eason Chan' songs, while she likes to hear some excitement songs when facing with some unpleasant things. However, a recommendation system cannot be aware of the user's emotion. As another example, B likes to listen to Beyond' songs, while he prefers listening to soothing, gentle music in the bus, subway and other noisy environments. However, the recommendation system cannot be aware of the user's current environment. So the recommendation system cannot recommend the right songs, namely is short of real-time, flexibility and usability.

SUMMARY

The present disclosure seeks to solve at least one of the above problems.

Accordingly, a first objective of the present disclosure is to provide a mobile terminal-based song recommendation method. The method may recommend a song in the mobile terminal to a user by inputting a gesture symbol and by means of a keyword identified based on the gesture symbol, thus improving the user's experience and having convenience, high efficiency and usability.

A second objective of the present disclosure is to provide a mobile terminal-based song recommendation device.

A third objective of the present disclosure is to provide an application program.

A fourth objective of the present disclosure is to provide a storage medium.

In order to realize the above objectives, a mobile terminal-based song recommendation method according to embodiments of a first aspect of the present disclosure includes: providing a gesture management interface in a mobile terminal, receiving and storing a gesture symbol inputted in the gesture management interface by a user; establishing an association relationship between the gesture symbol and a keyword identified by the mobile terminal; receiving a gesture symbol inputted by the user; determining whether the gesture symbol inputted by the user is in the mobile terminal; and recommending one or more songs in the mobile terminal according to the gesture symbol if the gesture symbol is in the mobile terminal.

In order to realize the above objectives, a mobile terminal-based song recommendation device according to embodiments of a second aspect of the present disclosure includes: a providing module, configured to provide a gesture management interface in a mobile terminal; a receiving module, configured to receive a gesture symbol inputted in the gesture management interface by a user and to receive a gesture symbol inputted by the user; a storage module, configured to store the gesture symbol inputted in the gesture management interface by the user; an establishing module, configured to establish an association relationship between the gesture symbol and a keyword identified by the mobile terminal; a determining module, configured to determine whether the gesture symbol inputted by the user is in the mobile terminal; and a recommending module, configured to recommend one or more songs in the mobile terminal according to the gesture symbol.

Additional aspects and advantages of embodiments of present disclosure will be given in part in the following descriptions, become apparent in part from the following descriptions, or be learned from the practice of the embodiments of the present disclosure.

In order to realize the above objectives, an application program according to embodiments of a third aspect of the present disclosure is configured to execute the mobile terminal-based song recommendation method according to embodiments of the first aspect of the present disclosure when running.

In order to realize the above objectives, a storage medium according to embodiments of a fourth aspect of the present disclosure is configured to execute the mobile terminal-based song recommendation method according to embodiments of the first aspect of the present disclosure when running.

Additional aspects and advantages of embodiments of present disclosure will be given in part in the following descriptions, become apparent in part from the following descriptions, or be learned from the practice of the embodiments of the present disclosure.

In order to realize the above objectives, an application program according to embodiments of a third aspect of the present disclosure is configured to execute the mobile terminal-based song recommendation method according to embodiments of the first aspect of the present disclosure when running.

With the application program according to embodiments of the present disclosure, in the gesture management interface, the gesture symbol inputted by the user may be received and stored, the association relationship between the gesture symbol and the keyword identified by the mobile terminal may be established and the song in the mobile terminal may be recommended according to the keyword. The method may recommend the song in the mobile terminal to a user by inputting a gesture symbol and by means of the keyword identified based on the gesture symbol, thus improving the user's experience and having convenience, high efficiency and usability.

In order to realize the above objectives, a storage medium according to embodiments of a fourth aspect of the present disclosure is configured to execute the mobile terminal-based song recommendation method according to embodiments of the first aspect of the present disclosure when running.

With the storage medium according to embodiments of the present disclosure, in the gesture management interface, the gesture symbol input by the user may be received and stored, the association relationship between the gesture symbol and the keyword identified by the mobile terminal may be established and the song in the mobile terminal may be recommended according to the keyword. The method may recommend the song in the mobile terminal to a user by inputting a gesture symbol and by means of the keyword identified based on the gesture symbol, thus improving the user's experience and having convenience, high efficiency and usability.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
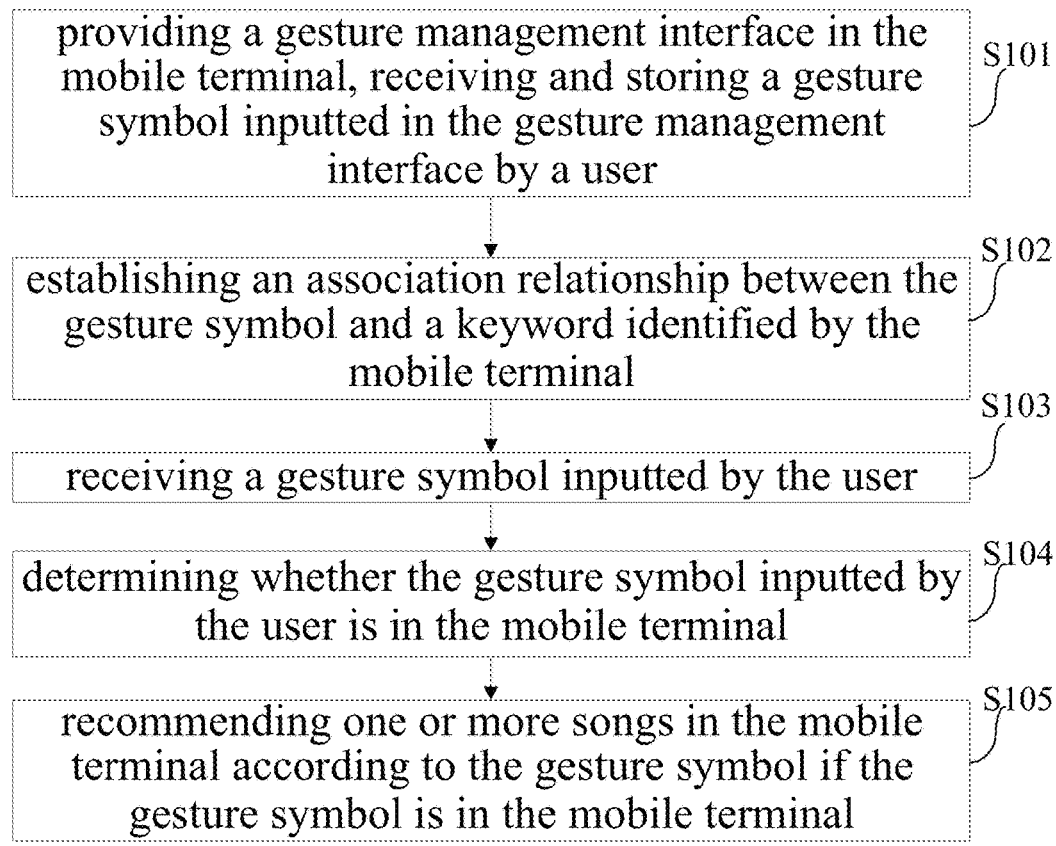
FIG. 1 is a flow chart showing a mobile terminal-based song recommendation method according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure. In contrast, the present disclosure may include alternatives, modifications and equivalents within the spirit and scope of the appended claims.

In the description of the present disclosure, it should be understood that, unless specified or limited otherwise, terms such as "first" and "second" are used herein for purposes of description and are not intended to indicate or imply relative importance or significance. In the description of the present disclosure, it should be noted that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure. In addition, in the description of the present disclosure, "a plurality of" means two or more, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

A mobile terminal-based song recommendation method and a mobile terminal-based song recommendation device according to embodiments of the present disclosure will be described with reference to accompanying drawings as follows.

For the current song recommendation in the related art, songs may be recommended to the user basically by analyzing the user's listening behavior and habit data. The user can only receive them passively but cannot select. However, the reality is that, the user's listening needs may be varied with the current mood, environment and other factors. For example, A is a shy girl and likes to listen to Eason Chan' songs while she likes to hear some excitement songs when facing with some unpleasant things. However, the recommendation system cannot be aware of the user's emotion. As another example, B likes to listen to Beyond' songs, while he prefers listening to soothing, gentle music in the bus, subway and other noisy environments. However, the recommendation system cannot be aware of the user's current environment. So the recommendation system cannot recommend the right songs, namely is short of real-time, flexibility and usability.

Accordingly, a mobile terminal-based song recommendation method provided by the preset disclosure, includes the following steps of providing a gesture management interface in a mobile terminal, receiving and storing a gesture symbol inputted by a user in the gesture management interface; establishing an association relationship between the gesture symbol and a keyword identified by the mobile terminal; receiving the gesture symbol inputted by the user; determining whether the gesture symbol inputted by the user is in the mobile terminal; and recommending one or more songs in the mobile terminal according to the gesture symbol if the gesture symbol is in the mobile terminal.

FIG. 1 is a flow chart showing a mobile terminal-based song recommendation method according to an embodiment of the present disclosure.

As shown in FIG. 1, the mobile terminal-based song recommendation method includes the following steps.

In S101, a gesture management interface is provided in the mobile terminal, and a gesture symbol inputted in the gesture management interface by a user is received and stored.

In an embodiment of the present disclosure, the gesture symbol includes one or more of a pattern symbol, a text symbol and a number symbol, thus improving diversity of the gesture symbol.

In S102, an association relationship between the gesture symbol and a keyword identified by the mobile terminal is established.

In S103, a gesture symbol inputted by the user is received.

In S104, it is determined whether the gesture symbol inputted by the user is in the mobile terminal.

In S105, one or more songs in the mobile terminal are recommended according to the gesture symbol if the gesture symbol is in the mobile terminal.

With the mobile terminal-based song recommendation method according to embodiments of the present disclosure, in the gesture management interface, the gesture symbol input by the user may be received and stored, the association relationship between the gesture symbol and the keyword identified by the mobile terminal may be established and the song in the mobile terminal may be recommended according to the keyword. The method may recommend the song in the mobile terminal to a user by inputting a gesture symbol and by means of the keyword identified based on the gesture symbol, thus improving the user's experience and having convenience, high efficiency and usability.

Figure 2:
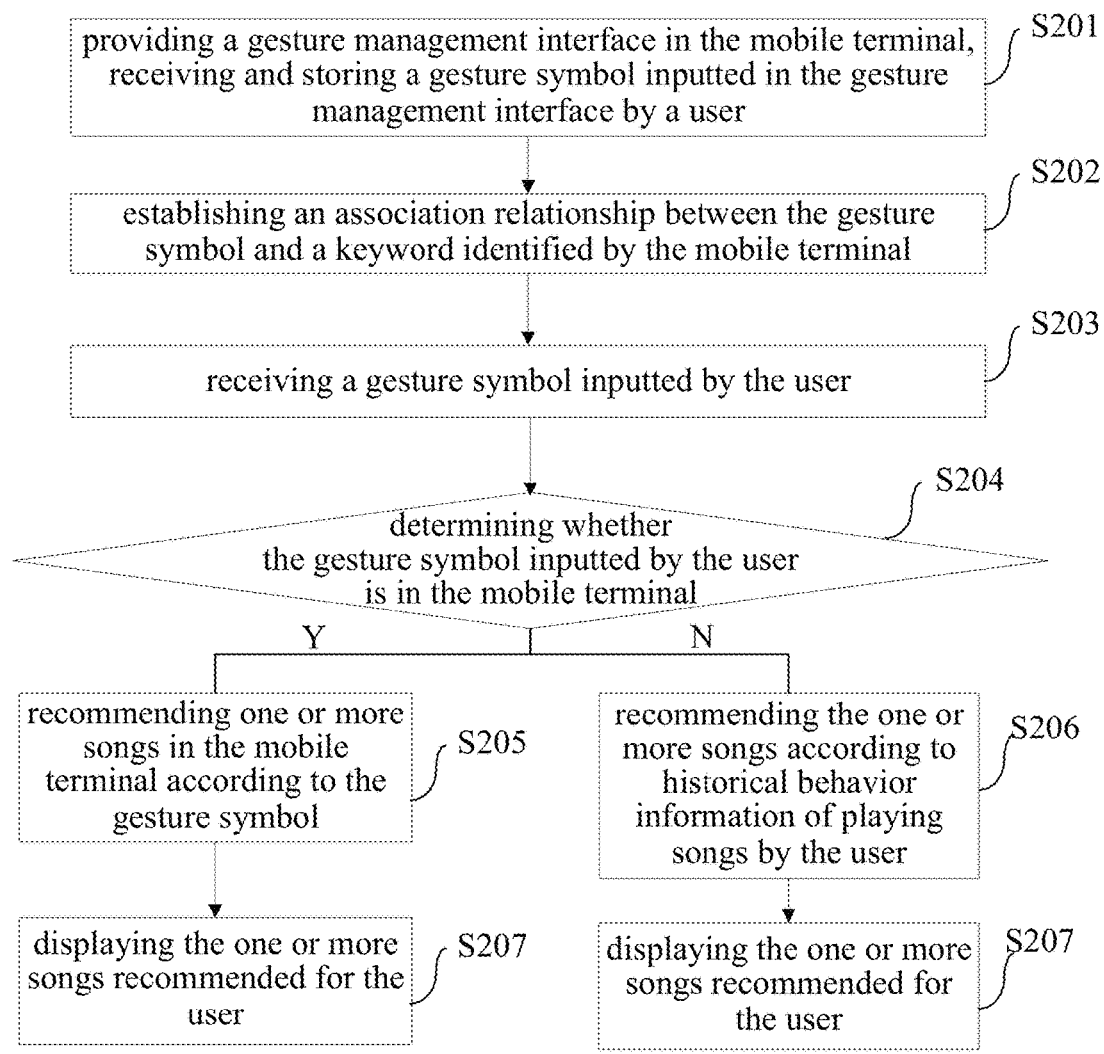
FIG. 2 is a flow chart showing a mobile terminal-based song recommendation method according to another embodiment of the present disclosure.

FIG. 2 is a flow chart showing a mobile terminal-based song recommendation method according to another embodiment of the present disclosure.

As shown in FIG. 2, the mobile terminal-based song recommendation method includes the following steps.

In S201, a gesture management interface is provided in the mobile terminal, and a gesture symbol inputted in the gesture management interface by a user is received and stored.

In an embodiment of the present disclosure, the gesture symbol includes one or more of a pattern symbol, a text symbol and a number symbol, thus improving diversity of the gesture symbol.

In S202, an association relationship between the gesture symbol and a keyword identified by the mobile terminal is established.

In S203, a gesture symbol inputted by the user is received.

In S204, it is determined whether the gesture symbol inputted by the user is in the mobile terminal.

In S205, one or more songs in the mobile terminal are recommended according to the gesture symbol if the gesture symbol is in the mobile terminal.

Specifically, if a gesture symbol inputted by a user is in the mobile terminal, firstly the keyword may be searched for according to the association relationship between the gesture symbol and the keyword identified by the mobile terminal established in advance, secondly, the one or more songs in the mobile terminal are searched for according to the keyword, such that the objective of recommending the one or more songs in the mobile terminal according to the gesture symbol may be realized, thereby improving the simplicity, high efficiency and usability of recommending songs according to the gesture symbol.

Further, a management operation is performed on the gesture symbol and the keyword corresponding to the gesture symbol according to a user instruction, in which the management operation includes the modification operation or deletion operation, thus improving flexibility and usability of managing the gesture symbol and the keyword corresponding to the gesture symbol by the user.

In S206, the one or more songs are recommended according to historical behavior information of playing songs by the user if the gesture symbol is not in the mobile terminal.

In an embodiment of the present disclosure, the historical behavior information includes one or more of a song completely played, a song skipped through, a song replayed, a song marked as a favorite and a song marked as an unfavorite by the user, thus improving diversity of the historical behavior information.

In S207, the one or more songs recommended for the user is displayed. The one or more songs recommended for the user may be displayed in various display forms, for example, in a form of list or grid.

With the mobile terminal-based song recommendation method according to embodiments of the present disclosure, in the gesture management interface, the gesture symbol input by the user may be received and stored, the association relationship between the gesture symbol and the keyword identified by the mobile terminal may be established and the song in the mobile terminal may be recommended according to the keyword. The method may recommend the song in the mobile terminal to a user by inputting a gesture symbol and by means of the keyword identified based on the gesture symbol, thus improving the user's experience and having convenience, high efficiency and usability.

Figure 3:
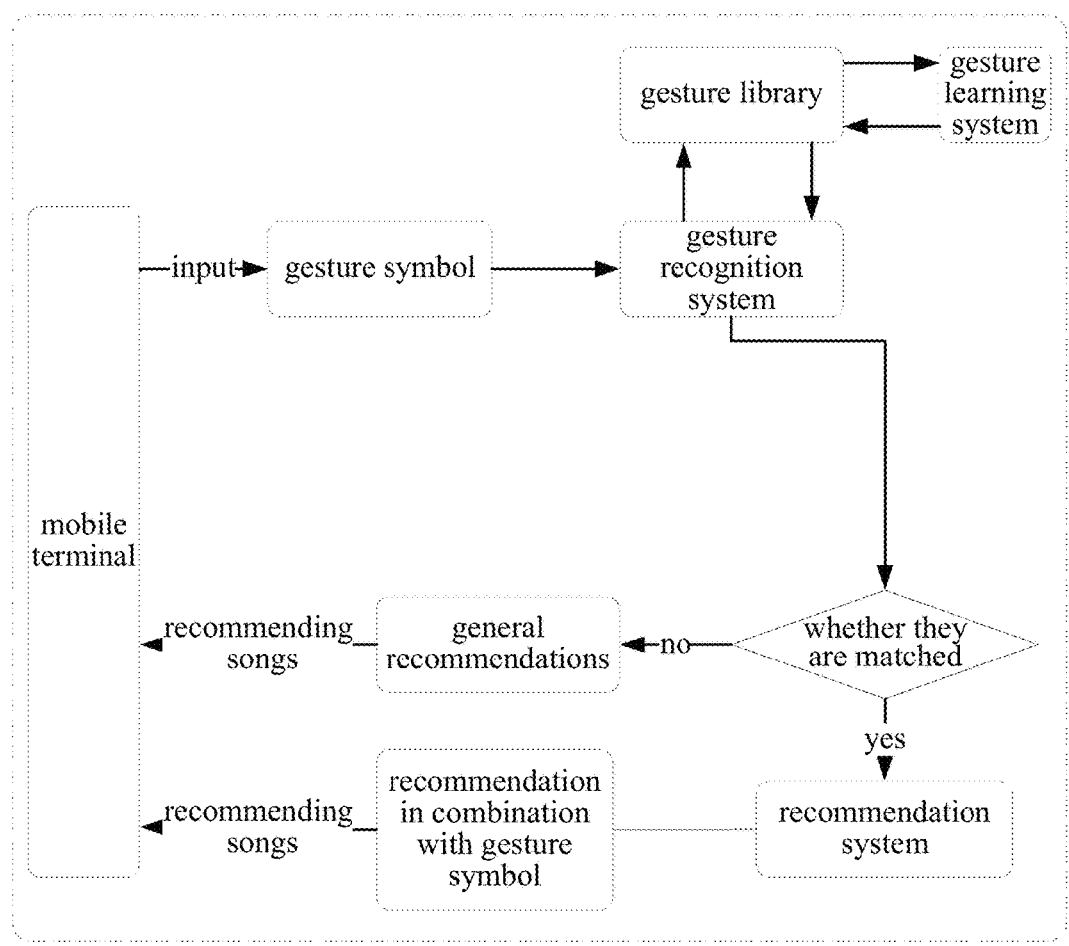
FIG. 3 is a schematic diagram of realizing a mobile terminal-based song recommendation method.

FIG. 3 is a schematic diagram of realizing a mobile terminal-based song recommendation method.

As shown in FIG. 3, an input of a gesture symbol may be performed in the mobile terminal, and then the gesture symbol may be converted into a keyword identifiable by the mobile terminal by a gesture recognition system in the mobile terminal, at the same time, the gesture symbol inputted in the mobile terminal and the corresponding keyword are stored in a gesture library of the mobile terminal. Further, a gesture learning system and the gesture library may interact with each other, and the gesture symbol may be stored into the gesture library via the gesture learning algorithm.

When the mobile terminal receives a gesture symbol inputted by the user, firstly, the received gesture symbol may be converted into a corresponding keyword by the gesture recognition system in the mobile terminal. If the inputted gesture symbol and the corresponding keyword exist in the gesture library, the gesture symbol and the corresponding keyword stored in the gesture library of the mobile terminal may be matched with the gesture symbol inputted by the user. If the matching is successful, a recommendation is performed by a recommendation system of the mobile terminal in combination with the gesture symbol inputted by the user, thus realizing the recommendation of the song in the mobile terminal to the user by inputting a gesture symbol and by means of the keyword identified based on the gesture symbol, improving the user's experience and having convenience, high efficiency and usability; if the matching is not successful, the one or more songs are recommended according to the historical behavior information of playing songs by the user.

In order to have better understanding and application for the mobile terminal-based song recommendation method, examples may be taken as follows.

Figure 4:
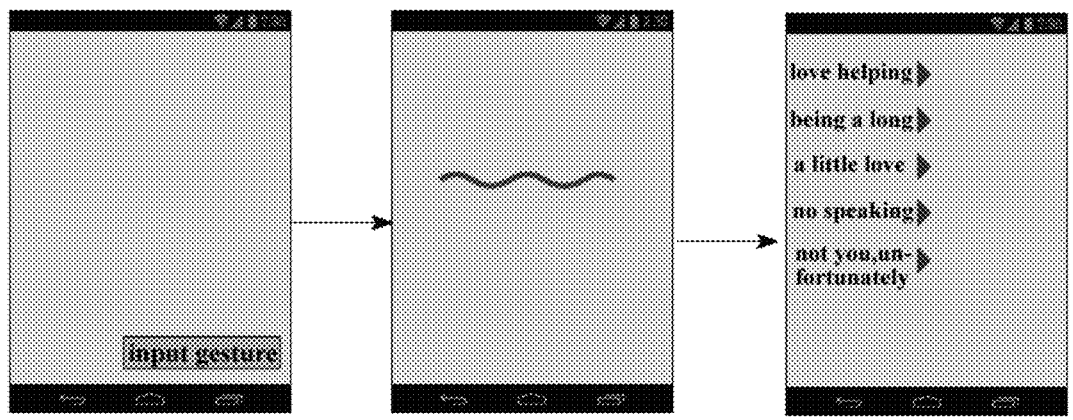
FIG. 4 is a specific schematic diagram of realizing a mobile terminal-based song recommendation method.
Figure 4:
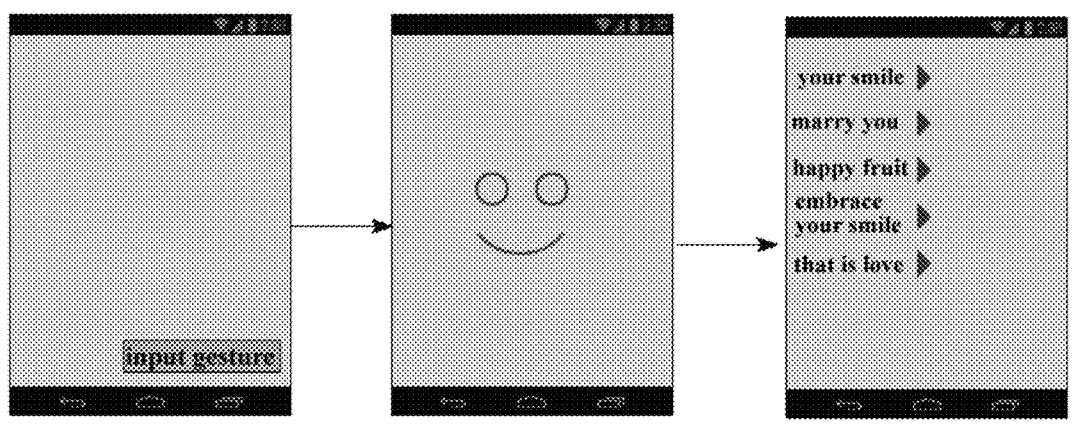

FIG. 4 is a specific schematic diagram of realizing a mobile terminal-based song recommendation method.

As shown in FIG. 4 (a), if a tilde is input in the gesture management interface provided in the mobile terminal, then the keyword may be identified depending on the degree of flatness, i.e. it is determined whether the user wants to listen to slow songs or explosive songs, and further the slow songs meeting the conditions may be recommended and displayed in the screen of the mobile terminal.

In particular, the above tilde and the keyword corresponding to the degree of flatness of the tilde may be stored in a gesture library of the mobile terminal in advance. When the tilde inputted by the user is received, it is further determined whether the tilde inputted by the user exists in the gesture library of the mobile terminal. One or more songs corresponding to the keyword associated with the tilde and stored in the mobile terminal in advance may be recommended if the tilde exists in the gesture library of the mobile terminal.

As shown in FIG. 4 (b), if an expression symbol is input in the gesture management interface provided in the mobile terminal, then the keyword may be identified depending on expression symbol. As shown in FIG. 4 (b), the expression symbol is a smile face, it is determined that cheerful songs are needed, and further the cheerful songs meeting the conditions may be recommend and displayed in the screen of the mobile terminal.

In particular, the above smile face symbol and the keyword corresponding to the smile face symbol may be stored in the gesture library of the mobile terminal in advance. When the smile face symbol inputted by the user is received, it is further determined whether the smile face symbol inputted by the user exists in the gesture library of the mobile terminal. One or more songs corresponding to the keyword associated with the smile face symbol and stored in the mobile terminal in advance may be recommended if the smile face symbol exist in the gesture library of the mobile terminal, thereby improving the user's experience and having convenience, high efficiency and usability of recommending songs.

In order to realize the above embodiments, a mobile terminal-based song recommendation device may be provided by the present disclosure.

The mobile terminal-based song recommendation device includes: a providing module, configured to provide a gesture management interface in a mobile terminal; a receiving module, configured to receive a gesture symbol inputted in the gesture management interface by a user and to receive a gesture symbol inputted by the user; a storage module, configured to store the gesture symbol inputted in the gesture management interface by the user; an establishing module, configured to establish an association relationship between the gesture symbol and a keyword identified by the mobile terminal; a determining module, configured to determine whether the gesture symbol inputted by the user is in the mobile terminal; and a recommending module, configured to recommend one or more songs in the mobile terminal according to the gesture symbol if the gesture symbol is in the mobile terminal.

Figure 5:
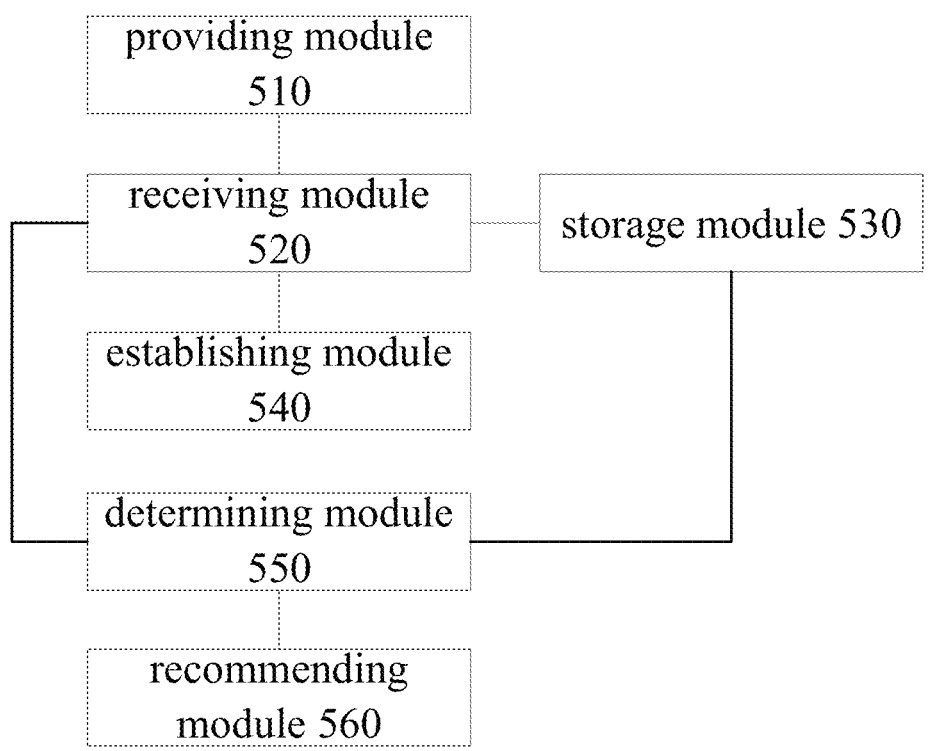
FIG. 5 is a block diagram showing a mobile terminal-based song recommendation device according to an embodiment of the present disclosure.

FIG. 5 is a block diagram showing a mobile terminal-based song recommendation device according to an embodiment of the present disclosure.

As shown in FIG. 5, the mobile terminal-based song recommendation device 50 includes a providing module 510, a receiving module 520, a storage module 530, an establishing module 540, a determining module 550 and a recommending module 560.

In an embodiment of the present disclosure, the providing module 510 is configured to provide a gesture management interface in the mobile terminal; the receiving module 520 is configured to receive a gesture symbol inputted in the gesture management interface by a user and to receive a gesture symbol inputted by the user.

In an embodiment of the present disclosure, the gesture symbol includes one or more of a pattern symbol, a text symbol and a number symbol, thus improving diversity of the gesture symbol.

In an embodiment of the present disclosure, the storage module 530 is configured to store the gesture symbol inputted in the gesture management interface by the user; the establishing module 540 is configured to establish an association relationship between the gesture symbol and a keyword identified by the mobile terminal; the determining module 550 is configured to determine whether the gesture symbol inputted by the user is in the mobile terminal; and the recommending module 560 is configured to recommend one or more songs in the mobile terminal according to the gesture symbol if the gesture symbol is in the mobile terminal.

In an embodiment of the present disclosure, the recommending module 560 is further configured to recommend the one or more songs according to historical behavior information of playing songs by the user if the gesture symbol is not in the mobile terminal, thus improving usability of recommending songs.

In an embodiment of the present disclosure, the historical behavior information includes one or more of a song completely played, a song skipped through, a song replayed, a song marked as a favorite and a song marked as an unfavorite by the user, thus improving diversity of the historical behavior information.

With the mobile terminal-based song recommendation device according to embodiments of the present disclosure, in the gesture management interface provided by the proving module, the gesture symbol inputted by the user may be received by the receiving module and stored by the storage module, the association relationship between the gesture symbol and the keyword identified by the mobile terminal may be established by the establishing module and the song in the mobile terminal may be recommended by the recommending module according to the keyword. The device may recommend the song in the mobile terminal to a user by inputting a gesture symbol and by means of the keyword identified based on the gesture symbol, thus improving the user's experience and having convenience, high efficiency and usability.

Figure 6:
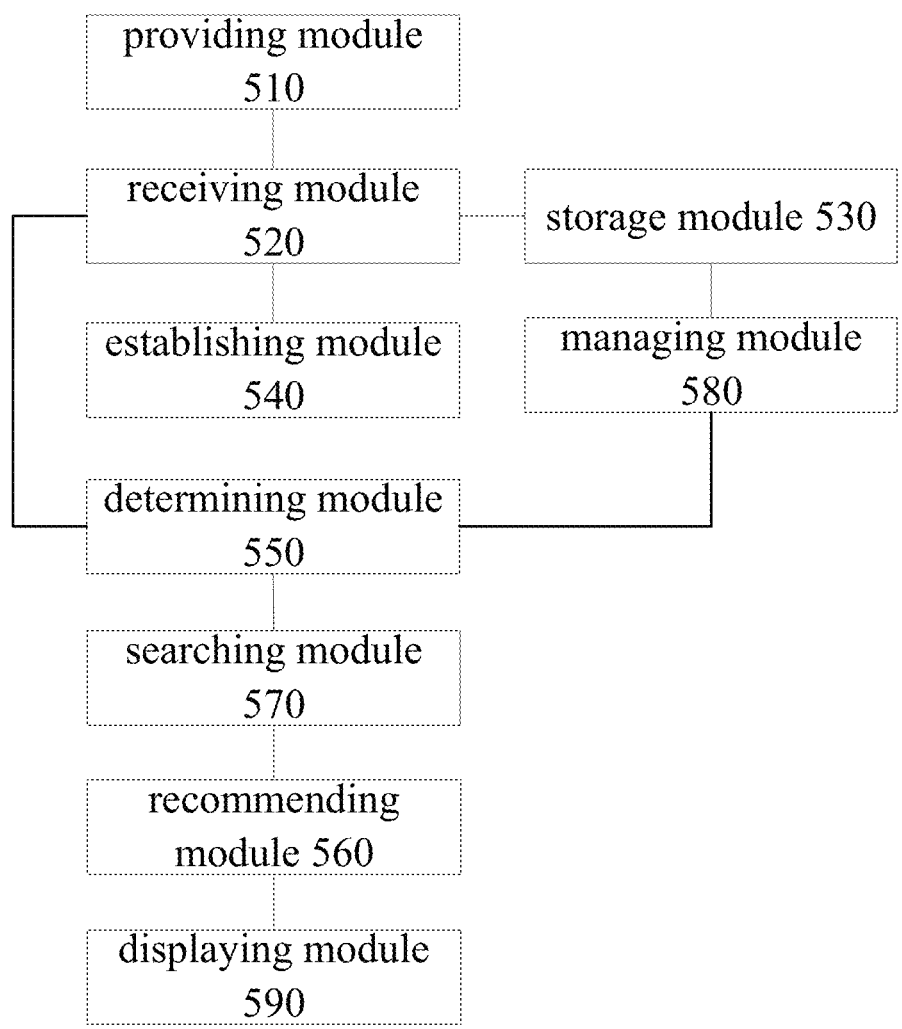
FIG. 6 is a block diagram showing a mobile terminal-based song recommendation device according to another embodiment of the present disclosure.

FIG. 6 is a block diagram showing a mobile terminal-based song recommendation device according to another embodiment of the present disclosure.

As shown in FIG. 6, the mobile terminal-based song recommendation device 50 further includes a searching module 570, a managing module 580 and a displaying module 590.

In an embodiment of the present disclosure, the searching module 570 is configured to search for the one or more songs in the mobile terminal according to the keyword, thus improving accuracy and usability of searching for the song according to the gesture symbol.

In an embodiment of the present disclosure, the managing module 580 is configured to perform a management operation on the gesture symbol and the keyword corresponding to the gesture symbol according to a user instruction, in which the management operation includes the modification operation or deletion operation, thus improving flexibility and usability of managing the gesture symbol and the keyword corresponding to the gesture symbol by the user.

In an embodiment of the present disclosure, the displaying module 590 is configured to display the one or more songs recommended for the user, thus improving visibility and operability of recommending the song to the user.

With the mobile terminal-based song recommendation device according to embodiments of the present disclosure, in the gesture management interface provided by the proving module, the gesture symbol inputted by the user may be received by the receiving module and stored by the storage module, the association relationship between the gesture symbol and the keyword identified by the mobile terminal may be established by the establishing module and the song in the mobile terminal may be recommended by the recommending module according to the keyword. The device may recommend the song in the mobile terminal to a user by inputting a gesture symbol and by means of the keyword identified based on the gesture symbol, thus improving the user's experience and having convenience, high efficiency and usability.

In order to realize the above embodiments, an application program may be provided by the present disclosure. The application program is configured to execute the mobile terminal-based song recommendation method according to embodiments of the present disclosure when running.

With the application program according to embodiments of the present disclosure, in the gesture management interface, the gesture symbol inputted by the user may be received and stored, the association relationship between the gesture symbol and the keyword identified by the mobile terminal may be established and the song in the mobile terminal may be recommended according to the keyword. The method may recommend the song in the mobile terminal to a user by inputting a gesture symbol and by means of the keyword identified based on the gesture symbol, thus improving the user's experience and having convenience, high efficiency and usability.

In order to realize the above embodiments, a storage medium may be provided by the present disclosure. The storage medium is configured to store the application program configured to execute the mobile terminal-based song recommendation method according to embodiments of the present disclosure when running.

With the storage medium according to embodiments of the present disclosure, in the gesture management interface, the gesture symbol inputted by the user may be received and stored, the association relationship between the gesture symbol and the keyword identified by the mobile terminal may be established and the song in the mobile terminal may be recommended according to the keyword. The method may recommend the song in the mobile terminal to a user by inputting a gesture symbol and by means of the keyword identified based on the gesture symbol, thus improving the user's experience and having convenience, high efficiency and usability.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A mobile terminal-based song recommendation method, comprising:

providing a gesture management interface in a mobile terminal, receiving and storing a gesture symbol inputted in the gesture management interface by a user in a gesture library;

establishing an association relationship between the gesture symbol and a keyword identified by the mobile terminal;

receiving a gesture symbol inputted by the user;

determining whether the gesture symbol inputted by the user is in gesture library; and recommending at least one song in the mobile terminal according to the gesture symbol if the gesture symbol is in the gesture library.

2. The method according to claim 1, further comprising:
recommending the at least one song according to historical behavior information of playing songs by the user if the gesture symbol is not in the gesture library.

3. The method according to claim 2, wherein the historical behavior information comprises at least one of a song completely played, a song skipped through, a song replayed, a song marked as a favorite and a song marked as an unfavorite by the user.

4. The method according to claim 1, wherein the gesture symbol comprises at least one of a pattern symbol, a text symbol and a number symbol.

5. The method according to claim 1, further comprising:
searching for the at least one song in the mobile terminal according to the keyword.

6. The method according to claim 1, further comprising:
performing a management operation on the gesture symbol and the keyword corresponding to the gesture symbol according to a user instruction.

7. The method according to claim 6, wherein the management operation comprises at least one of a modification operation and a deletion operation.

8. The method according to claim 1, further comprising:
displaying the at least one song recommended for the user.

9. A mobile terminal-based song recommendation device, comprising:
a mobile terminal, including:
a processor;
a memory for storing instructions executable by the processor;
wherein the processer is configured to:
provide a gesture management interface, including a gesture library;
receive a gesture symbol inputted in the gesture management interface by a user and to receive a gesture symbol inputted by the user;
store the gesture symbol inputted in the gesture management interface by the user;
establish an association relationship between the gesture symbol and a keyword identified by the mobile terminal;
determine whether the gesture symbol inputted by the user is in the gesture library; and
recommend at least one song in the mobile terminal according to the gesture symbol if the gesture symbol is in the gesture library.

10. The device according to claim 9, wherein the processer is further configured to recommend the at least one song according to historical behavior information of playing songs by the user if the gesture symbol is not in the gesture library.

11. The device according to claim 10, wherein the historical behavior information comprises at least one of a song completely played, a song skipped through, a song replayed, a song marked as a favorite and a song marked as an unfavorite by the user.

12. The device according to claim 9, wherein the gesture symbol comprises at least one of a pattern symbol, a text symbol and a number symbol.

13. The device according to claim 9, wherein the processer is further configured to:
search for the at least one song in the mobile terminal according to the keyword.

14. The device according to claim 9, wherein the processer is further configured to:
perform a management operation on the gesture symbol and the keyword corresponding to the gesture symbol according to a user instruction.

15. The device according to claim 14, wherein the management operation comprises at least one of a modification operation and a deletion operation.

16. The device according to claim 9, wherein the processer is further configured to:
display the at least one song recommended for the user.

17. An application program for executing a mobile terminal-based song recommendation method when running, wherein the method comprises:
providing a gesture management interface in a mobile terminal, receiving and storing a gesture symbol inputted in the gesture management interface by a user in a gesture library;
establishing an association relationship between the gesture symbol and a keyword identified by the mobile terminal;
receiving a gesture symbol inputted by the user;
determining whether the gesture symbol inputted by the user is in the gesture library; and
recommending at least one song in the mobile terminal according to the gesture symbol if the gesture symbol is in the gesture library.

* * * * *